(12) United States Patent
Voight et al.

(10) Patent No.: US 6,865,466 B2
(45) Date of Patent: Mar. 8, 2005

(54) ACTIVE VIBRATION CANCELLATION OF GEAR MESH VIBRATION

(75) Inventors: Michael A. Voight, Troy, MI (US); Daniel V. Sagady, Clarkston, MI (US); David P. Schankin, Harper Woods, MI (US); Jeffrey N. Heaton, Rochester Hills, MI (US); Rachel Dudley, Ames, IA (US); Matt Geissinger, Ames, IA (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 09/796,205

(22) Filed: Feb. 28, 2001

(65) Prior Publication Data

US 2004/0054455 A1 Mar. 18, 2004

Related U.S. Application Data

(60) Provisional application No. 60/199,971, filed on Apr. 27, 2000.

(51) Int. Cl.$^7$ .............................................. G06F 19/00
(52) U.S. Cl. ............................ 701/53; 701/111; 702/56
(58) Field of Search ............................... 701/1, 29, 53, 701/111; 702/56; 74/574

(56) References Cited

U.S. PATENT DOCUMENTS

| | | | |
|---|---|---|---|
| 4,025,724 A | | 5/1977 | Davidson, Jr. et al. |
| 4,796,873 A | | 1/1989 | Schubert |
| 4,977,508 A | | 12/1990 | Tanaka et al. |
| 5,049,795 A | | 9/1991 | Moulds, III |
| 5,310,137 A | * | 5/1994 | Yoerkie et al. .......... 244/17.27 |
| 5,458,222 A | | 10/1995 | Pla et al. |
| 5,553,514 A | | 9/1996 | Walkowc |
| 5,638,305 A | * | 6/1997 | Kobayashi et al. ......... 700/280 |
| 5,647,579 A | * | 7/1997 | Satoh ..................... 267/140.14 |
| 5,653,317 A | | 8/1997 | Wakui |
| 5,758,311 A | | 5/1998 | Tsuji et al. |
| 5,792,948 A | * | 8/1998 | Aoki et al. .................... 73/116 |
| 5,809,152 A | | 9/1998 | Nakamura et al. |
| 5,809,843 A | | 9/1998 | Barger et al. |
| 5,845,236 A | | 12/1998 | Jolly et al. |
| 5,899,443 A | | 5/1999 | Su |
| 5,950,756 A | * | 9/1999 | Satoh et al. ................. 180/312 |
| 5,954,169 A | | 9/1999 | Jensen |
| 5,955,674 A | * | 9/1999 | McGovern et al. ........... 73/650 |
| 6,018,689 A | * | 1/2000 | Kumura et al. ............. 700/280 |
| 6,229,898 B1 | * | 5/2001 | Goodman .................. 381/71.4 |
| 6,256,545 B1 | * | 7/2001 | Kimura et al. ................ 700/28 |
| 6,678,605 B2 | * | 1/2004 | Kisaka et al. ............... 701/111 |
| 2004/0069092 A1 | * | 4/2004 | Schankin et al. ............. 74/574 |

FOREIGN PATENT DOCUMENTS

WO    WO 93/19458    9/1993

* cited by examiner

Primary Examiner—Gary Chin
(74) Attorney, Agent, or Firm—Harness, Dickey & Pierce P.L.C.

(57) ABSTRACT

A drivetrain component assembly comprising a drivetrain structure, means for generating a reference signal indicative of a frequency with which the drivetrain structure vibrates during operation of the drivetrain structure, at least one actuator coupled to the drivetrain structure, at least one sensor operable for monitoring vibrations transmitted from the drivetrain structure and producing a sensor signal in response thereto and a controller coupled to the at least one actuator and the at least one sensor. The controller receives the sensor and reference signals and generates an actuator signal in response thereto. The at least one actuator receives the actuator signal and generates a canceling vibration in the drivetrain structure in response thereto. The canceling vibration has a predetermined frequency and amplitude to substantially cancel-out vibrations in a predetermined bandwidth that are generated during the operation of the drivetrain structure. A method for analyzing the effect of a drivetrain component on a level of noise, vibration and harshness transmitted to a vehicle passenger compartment is also provided.

22 Claims, 5 Drawing Sheets

ACTIVE VIBRATION CANCELLATION OF GEAR MESH VIBRATION

CROSS-REFERENCE TO RELATED APPLICATIONS

This application claims the benefit of U.S. Provisional Application No. 60/199,971, filed Apr. 27, 2000.

BACKGROUND OF THE INVENTION

1. Technical Field

The present invention generally pertains to devices and methods for the control of noise, vibration and harshness. More particularly, the present invention is related to a drivetrain component for a vehicle which adaptively controls noise vibration and harshness transmitted to a vehicle passenger compartment. The present invention also pertains to a method for analyzing the effect of a drivetrain component on the level of noise, vibration and harshness transmitted to a vehicle passenger compartment.

2. Discussion

Modernly, vehicle consumers and vehicle manufacturers have become increasingly aware of the desirability for a vehicle passenger compartment that not only feels comfortable and has an aesthetically pleasing appearance, but also is as free as possible from noise which emanates from the exterior of the vehicle passenger compartment. Consequently, vehicle manufacturers expend considerable resources to eliminate or dampen vibrations to prevent the transmission of noise, vibration and harshness (NVH) into the passenger compartment.

Conventionally, dampers or other mechanical vibration absorbing devices have been employed to dampen vibrations to prevent the transmission of NVH into the vehicle passenger compartment. This approach, however, has several drawbacks. One such drawback is that these devices are usually tuned to a specific frequency and consequently, will only dampen vibrations within a relatively narrow frequency band. Accordingly, these devices are typically employed to effectively dampen vibrations at a single critical frequency and offer little or no dampening for vibrations which occur at other frequencies.

Another drawback with conventional mechanical dampening devices relates to their incorporation into an application, such as an automotive vehicle. Generally speaking, these devices tend to have a relatively large mass, rendering their incorporation into a vehicle difficult due to their weight and overall size. Another factor that frequently arises with the incorporation of these devices into a vehicle relates to their positioning in the vehicle. Frequently, it is not possible to mount these devices in the position at which they would be most effective as these same points may be in use for supporting the vehicle body or because the size of the device will not permit it to be packaged into the vehicle at a particular location.

Recognizing the limitations of mechanical dampening devices, another technique has been proposed wherein unwanted noise is canceled out by a sound wave that is equal in amplitude but shifted out-of-phase by 180 degrees. This approach, too, has several drawbacks which significantly limit the overall effectiveness with which this technology may be successfully integrated into a vehicle. Several of the more significant drawbacks stem from the fact that the vibrations which cause NVH in the vehicle passenger compartment are still being generated. Consequently, it is still necessary to employ mechanical damping devices to attenuate the vibration that is transmitted into the vehicle passenger compartment. Another drawback associated with this approach is its broad-based effort to mask all noise regardless of the source of the noise. Consequently, these systems lack a mechanism which enables them to accurately predict the amplitude and frequency of the noise, thereby limiting the effectiveness with which they are able to mask the noise.

SUMMARY OF THE INVENTION

It is one object of the present invention to provide a system which reduces the level of noise that is transmitted from drivetrain component assemblies to a vehicle passenger compartment.

It is another object of the present invention to provide a drivetrain component assembly which attenuates vibration that it generates during the operation so as to avoid transmitting noise to a vehicle passenger compartment.

It is another object of the present invention to provide a drivetrain component assembly which is able to employ a reference signal to generate a canceling vibration to cancel out vibrations that are generated during the operation of the drivetrain component assembly.

It is a further object of the present invention to provide a method for analyzing the effect of a drivetrain component on a level of noise, vibration and harshness transmitted to a vehicle passenger compartment.

It is yet another object of the present invention to quantify the amount of noise in a vehicle passenger compartment that is attributable to a vehicle drivetrain component.

In one preferred form, the present invention provides a drivetrain component assembly comprising a drivetrain structure, means for generating a reference signal indicative of a frequency with which the drivetrain structure vibrates during operation of the drivetrain structure, at least one actuator coupled to the drivetrain structure, at least one sensor operable for monitoring vibrations transmitted from the drivetrain structure and producing a sensor signal in response thereto and a controller coupled to the at least one actuator and the at least one sensor. The controller receives the sensor and reference signals and generates an actuator signal in response thereto. The at least one actuator receives the actuator signal and generates a canceling vibration in the drivetrain structure in response thereto. The canceling vibration has a predetermined frequency and amplitude to substantially cancel-out vibrations in a predetermined bandwidth that are generated during the operation of the drivetrain structure. A method for analyzing the effect of a drivetrain component on a level of noise, vibration and harshness transmitted to a vehicle passenger compartment is also provided.

BRIEF DESCRIPTION OF THE DRAWINGS

Additional advantages and features of the present invention will become apparent from the subsequent description and the appended claims, taken in conjunction with the accompanying drawings wherein:

DETAILED DESCRIPTION OF THE PREFERRED EMBODIMENT

System Overview

Figure 1:
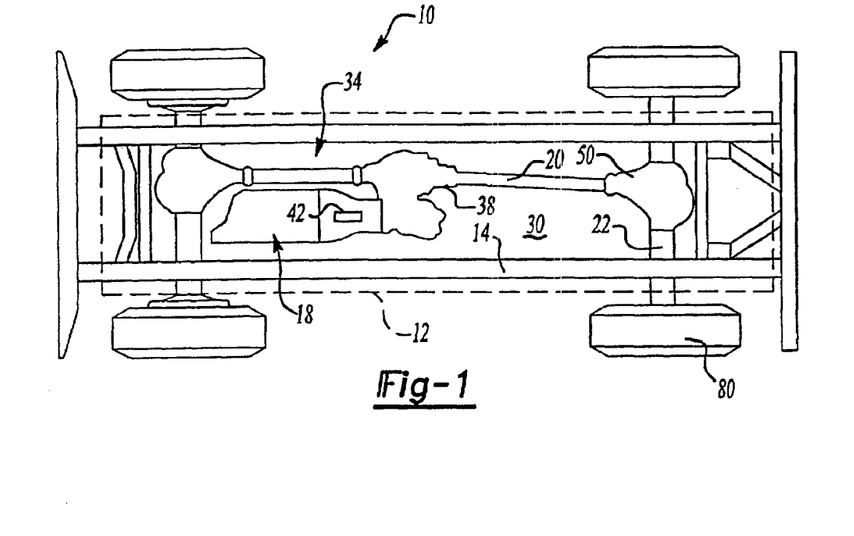
FIG. 1 is a schematic illustration of a vehicle having a vehicle drivetrain component constructed in accordance with the teachings of a preferred embodiment of the present invention.
Figure 2:
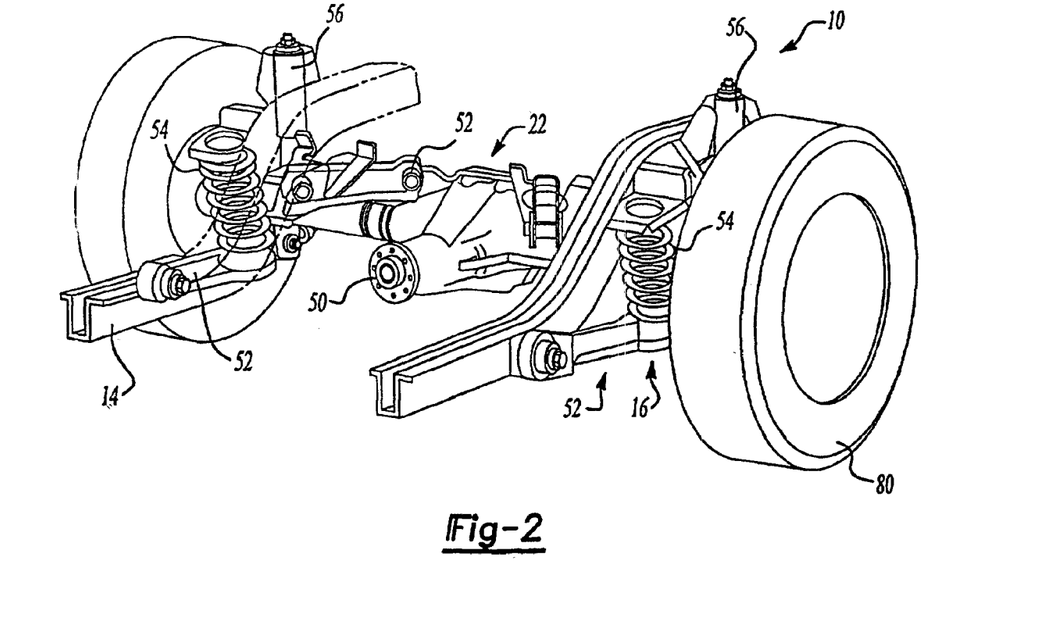
FIG. 2 is a perspective illustration of a portion of the vehicle of FIG. 1 illustrating the suspension system and drivetrain component assembly.
Figure 3:
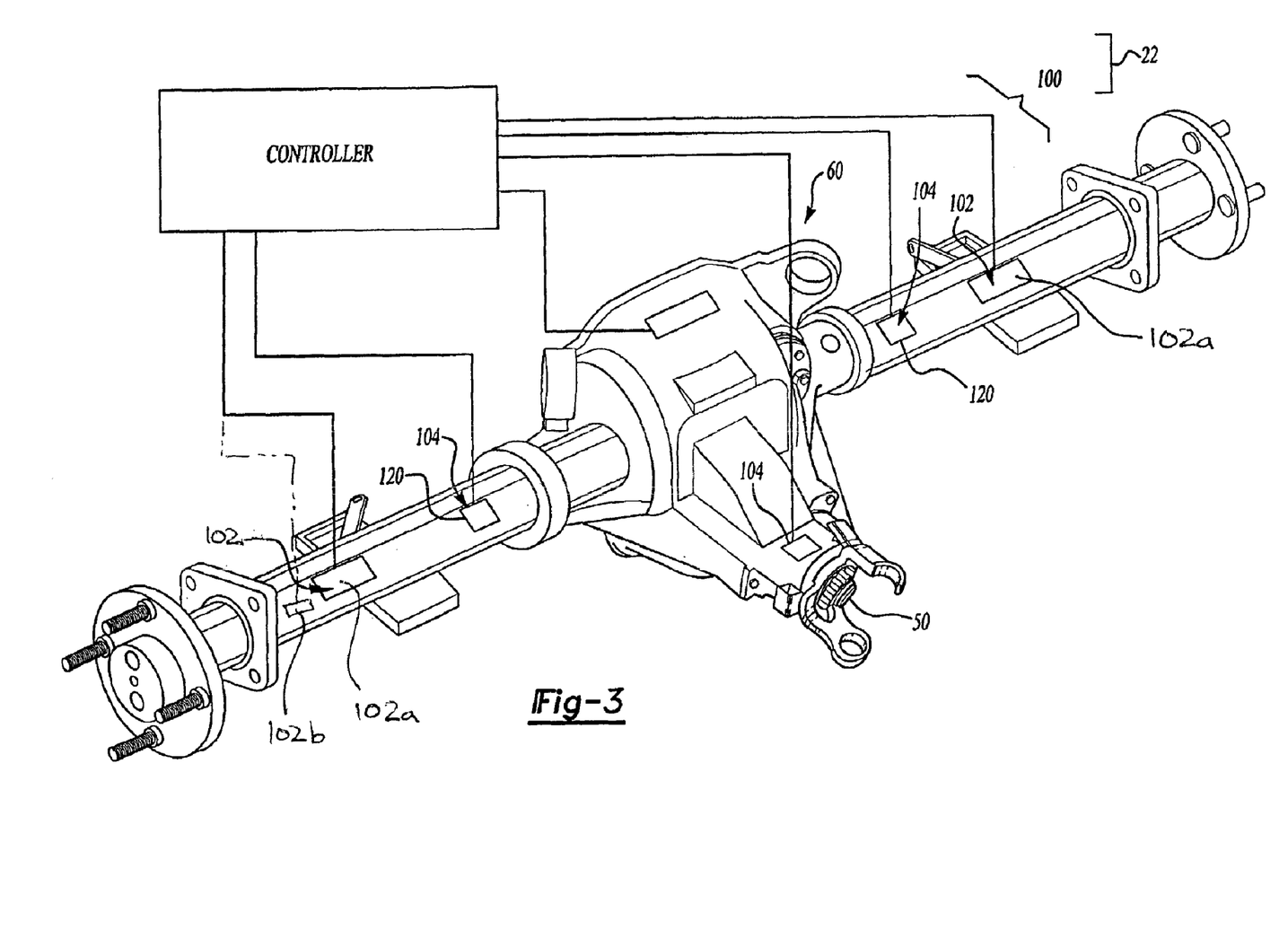
FIG. 3 is a perspective view of a portion of the vehicle of FIG. 1 illustrating the drivetrain component assembly in greater detail.

With reference to FIGS. 1 through 3 of the drawings, an illustrative vehicle is generally indicated by reference numeral 10. Vehicle 10 is shown to include a vehicle body 12, a chassis 14, a suspension system 16, a motor and transmission assembly 18, a propeller shaft 20 and an axle assembly 22 constructed in accordance with the teachings of a preferred embodiment of the present invention. Vehicle body 12, chassis 14, suspension system 16, motor and transmission assembly 18 and propeller shaft 20 are conventional in their construction and operation and as such, need not be discussed in detail.

Briefly, chassis 14 supports vehicle body 12, motor and transmission assembly 18 and propeller shaft 20. Vehicle body 12 surrounds chassis 14 and motor and transmission assembly 18 and includes a passenger compartment 30 in which the vehicle occupants are seated. Motor and transmission assembly 18, propeller shaft 20 and axle assembly 22 cooperate to form a vehicle drivetrain or driveline 34. Motor and transmission assembly 18 includes an output shaft 38 which is rotatably coupled to a first end of propeller shaft 20. A transmission controller 42 is operable for monitoring the speed of output shaft 38. Propeller shaft 20 is operable for receiving a rotational output from the output shaft 38 of motor and transmission assembly 18 and transmitting the rotational output to axle assembly 22 where it is received by a drive pinion gear 50. Suspension system 16 is operable for resiliently coupling axle assembly 22 to chassis 14. Suspension system 16 includes a plurality of suspension arms 52, a pair of coil springs 54 and a pair of shock absorbers 56.

Figure 3A:
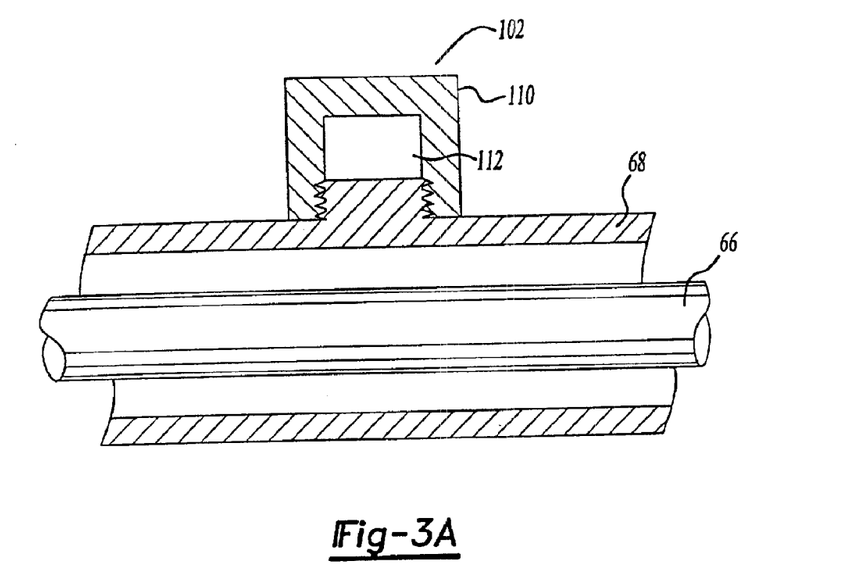
FIG. 3A is a schematic cross-sectional view of a portion of the drivetrain component assembly illustrating the connection of an actuator to the axle housing.
Figure 4:
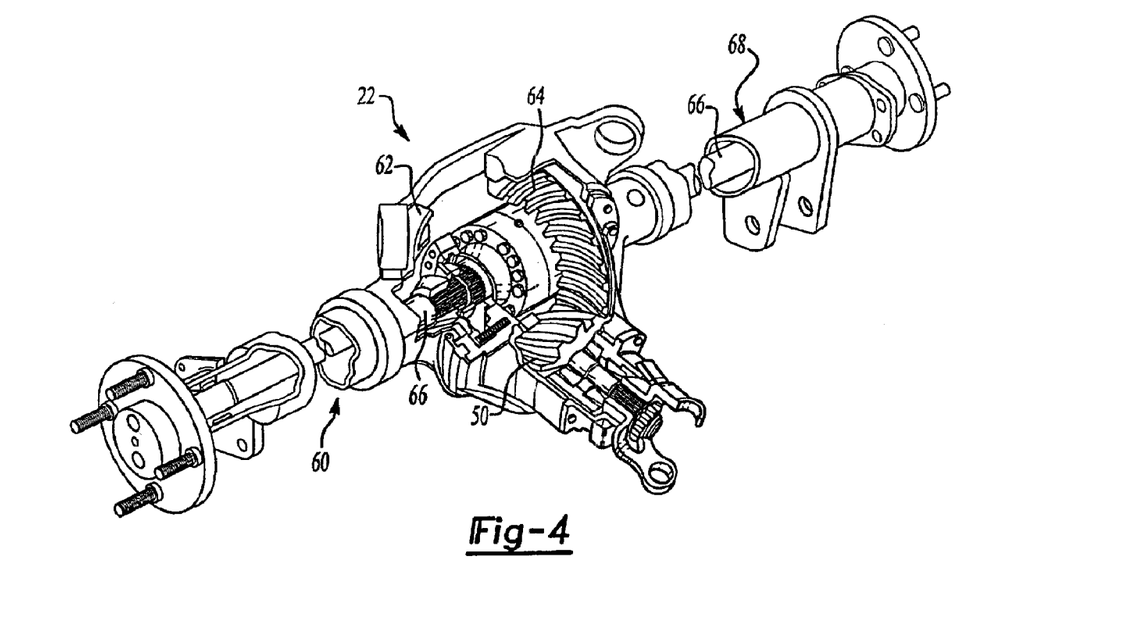
FIG. 4 is a partially sectioned view of a portion of the vehicle of FIG. 1 illustrating the drivetrain component assembly in greater detail.
Figure 5:
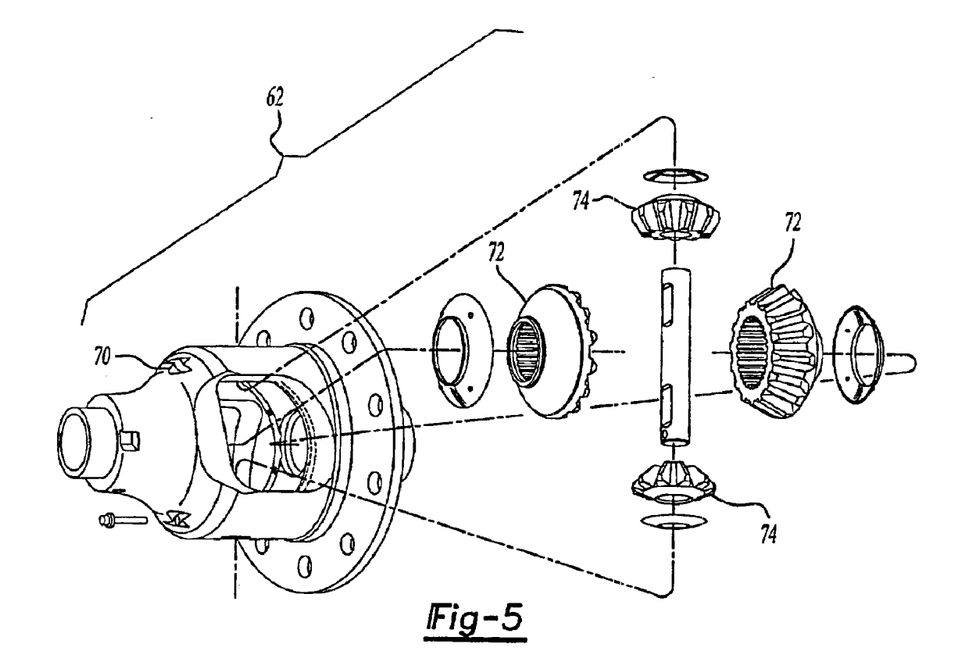
FIG. 5 is an exploded perspective view of the differential case assembly.

In FIGS. 3 through 5, axle assembly 22 is shown to include an axle structure 60 having the drive pinion gear 50, a differential case assembly 62, a ring gear 64, a pair of axle shafts 66 and an axle housing 68. Drive pinion gear 50, differential case assembly 62, ring gear 64 and axle shafts 66 are rotatably supported in axle housing 68. Drive torque received by drive pinion gear 50 from propeller shaft 20 is transmitted through ring gear 64 to differential case assembly 62. Differential case assembly 62 conventionally includes a differential case 70 and a pair of side gears 72 which are in meshing engagement with a pair of differential pinion gears 74. Each axle shaft 66 is coupled for rotation with one of the side gears 72. During the operation of the vehicle 10 in a relatively straight path, ring gear 64 and differential case assembly 62 rotate as a unit; differential pinion gears 74 and side gears 72 do not turn about their own axes, but apply equal effort to each of the differential side gears 72 and axle shafts 66. When the vehicle 10 is operated in a turn, the resistance against the rotation of one axle shaft 66 increases as the vehicle wheels 80 (FIGS. 1 & 3) turn at different speeds. This causes differential pinion gears 74 to turn on their own axes and roll around the differential side gear 72 on the reluctant one of the two axle shafts 66. This action allows the reluctant axle shaft 66 to slow down or stand still, causing a corresponding increase in the speed of rotation of the other axle shaft 66.

During the operation of vehicle 10, the operational forces acting on the vehicle drivetrain components (e.g., axle structure 60) provide a forcing function that excites specific drivetrain, suspension and body components resulting in vibrations which are transmitted into the vehicle passenger compartment 30 in the form of noise. This noise is generally tonal in nature, rendering it particularly noticeable to the vehicle occupants, regardless of the level of broadband background noise in the vehicle passenger compartment 30.

One source of vibrations that produces a particularly noticeable type of noise is related to hypoid gear mesh first harmonic motion variation (motion variation), which is also known as transmission error. Motion variation is the slight variation in the angular displacement between an input gear and an output gear. In modern production axle assemblies, for example, this variation is usually quite small, being on the order of 10 millionths of an inch measured tangentially at the pitchline of the gear. Motion variation not only varies between different pairs of gears, but will also typically vary within a pair of gears depending on the load exerted on the gears, the temperature of their environment, the gearset build position, and wear. Eliminating motion variation in the axle structure 60 is not commercially feasible, given the difficulty and cost associated with this task.

To eliminate vibrations generated in the axle structure 60 during the operation of the vehicle 10, a vibration cancellation mechanism 100 is also incorporated into axle assembly 22 as shown in FIG. 3. Vibration cancellation mechanism 100 includes a pair of actuators 102, a pair of vibration sensors 104 and a controller 106. As shown in FIG. 3A, each of the actuators 102 includes a stationary portion 110, which is fixedly coupled to the axle housing 68 at a predetermined location (discussed in detail, below), and a motion-imparting portion 112 which is controllable to transmit a canceling vibration to the axle structure 60. Actuators 102 may be any electromechanical or electro-magnetic actuator that is capable of transmitting a canceling vibration to axle structure 60 with the necessary frequency and amplitude. Preferably, as actuators 102 are used in an exterior environment, they are hermetically sealed to guard against damage from water and salt and operate within a temperature range of −65° F. to 250° F. Also preferably, the actuators 102 are magnetostrictive reaction mass actuators 102a wherein the motion-imparting portion 112 is formed from a magnetostrictive metal alloy. Construction in this manner permits the overall length of the motion-imparting portion 112 to be changed by immersing the motion-imparting portion in a magnetic field. Accordingly, the magnetostrictive reaction mass actuators 102a are capable of generating energy which is transmitted to the axle housing 68 with a relatively high force (approximately 50N) with a frequency of over 400 Hz. Alternatively, the actuators 102 may be piezo-electric actuators 102b.

Vibration sensors 104 are placed on the vehicle 10 at predetermined locations along target transfer paths and are operable for monitoring the vibrations transmitted along their target transfer path and generating a sensor signal in response thereto. The term "transfer path" refers to a path from the axle structure 60 to the vehicle passenger compartment 30 along which the vibrations generated during the operation of the axle assembly 22 are transmitted. Accordingly, the vibration sensors 104 need not be placed on the axle structure 60, but may be coupled to any portion of the vehicle 10 through which the vibrations are transmitted. In the particular example provided, vibration sensors 104 are accelerometers 120 having a nominal sensitivity of 100 mV/g with a shock limit of 5000 g's.

Controller 106 is coupled to vibration sensors 104, actuators 102 and a means for generating a reference signal indicative of a frequency with which the axle structure 60 vibrates during operation. In the particular example provided, the noise of concern stems from motion variation between the gears in the axle structure 60, rendering the frequency of the noise a function of the rotational speed of the output shaft 38 of the motor and transmission assembly 18. Accordingly, the means for generating a reference signal in the example provided is the transmission controller, with the reference signal being a signal indicative of the speed of the output shaft 38. Those skilled in the art will understand, however, that the rotational speed of the propeller shaft 20 or the rotational speed of the axle shafts 66 is equal or proportional to the rotational speed of the output shaft 38 and as such, these speeds may also be employed as the reference signal.

Figure 6:
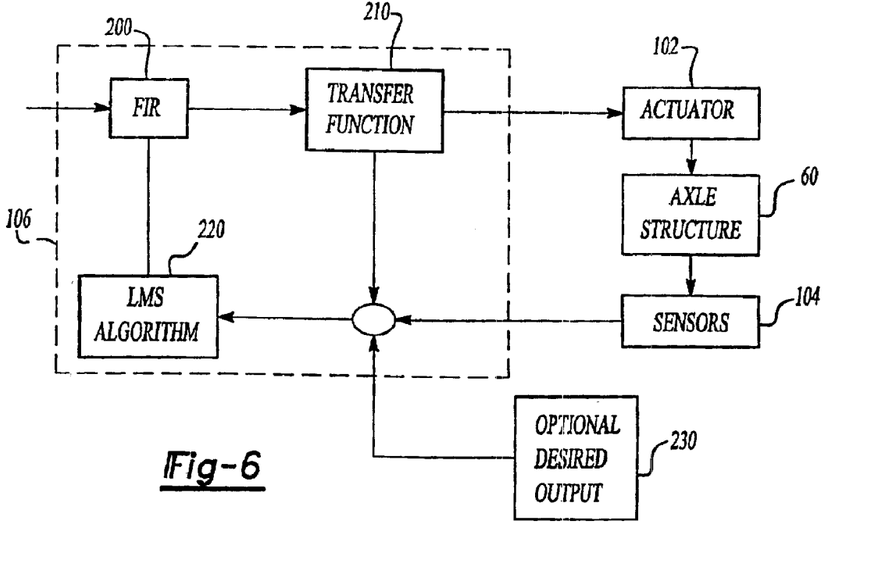
FIG. 6 is a schematic illustration of the vibration canceling mechanism.

With additional reference to FIG. 6, controller 106 processes the reference signal through a filter 200, such as a finite impulse response filter, using a transfer function 210 to calculate the frequency and amplitude of a canceling vibration. Controller 106 next generates an actuator signal to the actuators 102, causing the actuators 102 to transmit a cancellation vibration to the axle structure 60. Vibration sensors 104 monitor the vibrations that are transmitted along their respective transfer path and generate sensor signals in response thereto. Accordingly, the vibration sensors 104 are monitoring the effectiveness with which vibrations in the axle assembly 22 are being canceled out.

Controller 106 receives the sensor signals and employs an algorithm 220, such as a least-mean-square algorithm, to analyze the frequency and amplitude of a canceling vibration, the difference between the vibrations generated during the operation of the axle assembly 22 and the vibrations generated by the actuators 102 and, optionally, a desired output 230 to determine a set of filter weights for use in the filter 200. The desired output 230 permits the vibration cancellation mechanism 100 to be driven to a desired response which may be useful, for example, in testing of the vibration cancellation mechanism 100 or in optimizing its performance. In the particular example provided, the set of filter weights includes a first filter weight for a current sample of the reference signal and a second weight for a previous sample of the reference signal.

In the example provided, the controller 106, upon the activation of the vibration cancellation mechanism 100, may generate the actuator signal such that the canceling vibrations are in-phase with the vibrations that are generated by the axle structure 60 during its operation since the reference signal is only indicative of the speed of the output shaft 38. As the controller 106 has the ability to change the filter weights, the controller 106, through an iterative process, is able to precisely apply a canceling vibration to the axle housing 68 so that the vibrations generated during the operation of the axle structure 60 are substantially canceled out.

Prediction of Vibrations from Operation of Axle Assembly

To ensure that controller 106 is able to employ the reference signal to accurately predict the vibrations in the axle structure 60 that are generated during the operation of the axle assembly 22, it is imperative that the transfer and forcing functions associated with the controller 106 be fully understood. An initial step in the process of developing the transfer functions includes a preliminary identification of noise in the driveline wherein the vehicle 10 is operated and the parameters under at which unacceptable noise occurs are identified. These parameters typically include a speed or speed range, the operating temperature of the driveline 34, whether the vehicle 10 is being operated at a constant speed, accelerating or decelerating, and any additional nuances that may be required to duplicate the phenomenon.

Once documented, the phenomenon is re-created in a controlled environment, such as an hemi-anechoic chassis dynamometer. This permits all of the test parameters, such as vehicle speed, acceleration/deceleration, temperature, airflow and torque/loading, to be accurately controlled. Data from a speed sweep is then taken. The data includes an acoustic measurement of the noise in the passenger compartment 30, vibration measurements of one or more of the components of the driveline 34 and a corresponding reference signal, such as the speed of the output shaft 38 of the motor and transmission assembly 18. The speed sweep in the example provided ranged from about 25 m.p.h. to about 75 m.p.h. Data is then preferably plotted three-dimensionally as shown in FIG. 7 to permit those analyzing the data to easily discern between resonant frequencies and modes of vibration.

Figure 7:
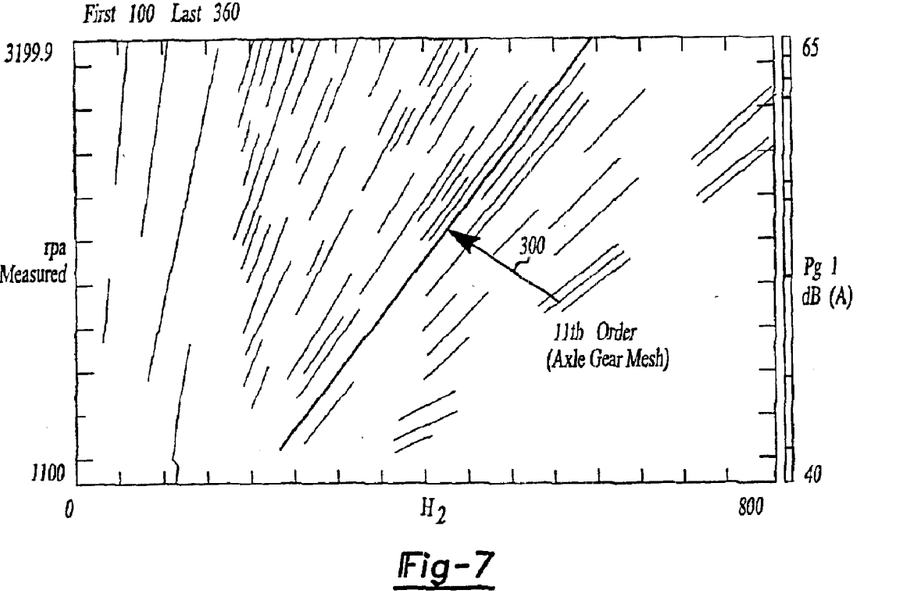
FIG. 7 is a plot of a speed sweep illustrating the magnitude and frequency of noise in the vehicle passenger compartment as a function of the propshaft speed.

In FIG. 7, the vibrations indicated by reference numeral 300 are a dominant source of the noise in the passenger compartment 30. These vibrations 300 have a frequency that is 11 times the speed of the output shaft 38, indicating that these vibrations are related to a mode of vibration. In the particular example provided, there are 11 teeth on the drive pinion gear 50, indicating that the drive pinion gear 50 is the likely source of the vibrations 300. With the likely source of the vibrations 300 identified, the test is performed again using an order-tracking method, with the results being illustrated in FIG. 8 by the plot indicated by reference numeral 310. Ideally, the analysis should adaptively resample the data proportionally to the reference signal (e.g., the speed of the output shaft 38) to provide constant order resolution.

The next step in the process is to determine the contribution of each of the transfer paths. A transfer path is a path through which vibrations 300 are transmitted to the vehicle passenger compartment 30. The transfer path may include components of the suspension system 16, and/or may partially utilize an airborne path. Typically, the transfer paths from an axle assembly 22 which most heavily contribute to the level of noise in the vehicle passenger compartment 30 are structure-borne paths which include components of the suspension system 16.

Figure 8:
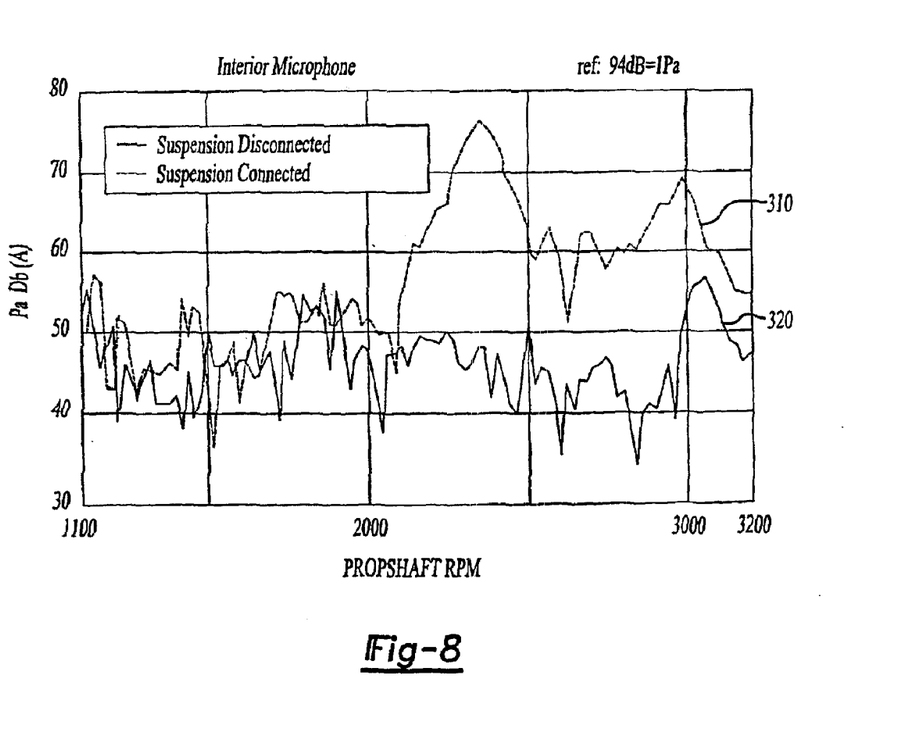
FIG. 8 is a plot illustrating the level of noise in the vehicle passenger compartment as a function of the propshaft speed.

A disconnect study is next performed wherein the axle assembly 22 is disconnected from the chassis 14, leaving only an airborne path. This is accomplished by literally disconnecting the axle assembly 22 from vehicle 10 and operating the vehicle 10 on a dynamometer with the axle assembly 22 in a disconnected condition. The vehicle 10 is suspended from critical load-bearing mount locations, such as spring seats, to minimize any changes to the structural dynamics of the vehicle 10. The axle assembly 22 is restrained to the dynamometer using the suspension system 16, with the necessary pre-loads being applied to the suspension system 16 and the proper orientation of all components being maintained. A signature analysis sweep test using an order-tracking method, similar to the test described above, is then performed to enable the disconnected configuration of the vehicle 10 to be analyzed. The results of this test are shown in FIG. 8 and indicated by reference numeral 320. Overlaying plots 310 and 320 onto one another permits one to determine the maximum possible reduction in the noise level in the vehicle passenger compartment. In the particular example shown, maximum reductions of 15 dBA to 30 dBA are possible in the speed range of concern.

The next step in evaluating the contribution of each of the transfer paths includes a transfer path analysis wherein each of the anticipated vibro-acoustic energy paths are identified and their contribution to the level of noise in the vehicle passenger compartment is quantified. The transfer path analysis initially determines a transfer function between each connecting point between the axle assembly and the vehicle passenger compartment 30. The axle assembly 22 is initially disconnected from the anticipated transfer path and shakers and/or hammer excitation techniques are used to apply forces to the connecting point in X, Y and Z directions.

Quantification of the operational forces that are applied to each of the connecting points are next obtained. Ideally, these forces are obtained through experimental data or analytical simulation. However, as it is frequently not possible to mount force transducers to the connection points in vehicular applications, indirect force measurement may also be employed. As is well known in the art, one technique that may be employed concerns the deriving displacement from acceleration data and converting the displacement data into a force.

Applying the forcing function to each of the transfer functions and summating the individual results permits the accuracy of the analysis to be verified. In this regard, if the summation correctly predicts the noise level in the vehicle passenger compartment 30, the analysis is both complete and accurate. If, however, the summation does not correctly predict the noise level, one or more transfer paths may have been overlooked.

Resonance's and mode shapes are next defined, preferably through operational modal analysis rather than standard modal analysis due to the sensitivity of the vehicle 10 to the boundary conditions of the analysis. In contrast to operational modal analysis, the environment (including temperature) is static and the axle assembly 22 is not torque-loaded by the propeller shaft 20 in a standard modal analysis. Consequently, when standard modal analysis techniques are employed, a degree of inaccuracy is introduced into the analysis because the analysis changes the boundary conditions relating to the suspension system 16 and the chassis. Operational data is acquired at the vehicle speeds of concern. This data is acquired through the use of accelerometers. As this process of obtaining data is substantially identical to that employed for obtaining data for the transfer path analysis, above, this process will not be discussed in detail.

Integration of the Vibration Cancellation Mechanism

Effective integration of the vibration cancellation mechanism 100 into a driveline component such as the axle structure 60 requires consideration of the mounting locations for both the actuators 102 and the vibration sensors 104. Generally, the vibration sensors 104 are placed on target transfer paths at a point which is as close as possible to the anti-nodal points of targeted frequencies. Target transfer paths are those transfer paths which are most efficient at transmitting vibration into the vehicle passenger compartment. Placement of the vibration sensors 104 in this manner maximizes the signal-to-noise ratio, increasing the accuracy of the measurements taken by the vibration sensors 104. The actuators 102 are placed on the axle structure 60 as close as possible to the anti-nodes of targeted mode shapes as possible, with the preferred anti-node being the one closest to a target transfer path. Placement of the actuators 102 in this manner maximizes their effectiveness.

Depending on the complexity of the application, it may be necessary to employ several actuators 102 and an even greater number of vibration sensors 104. It is worth noting, however, that the vibration cancellation mechanism 100 should be kept as simple as possible so as to reduce the time required for optimization of the vibration cancellation mechanism 100, as well as to avoid relatively long computational times which could result from the increased complexity that accompanies an increase in the number of degrees of freedom in a system.

While the vibration cancellation mechanism of the present invention has been described thus far as being integrated with an axle structure, those skilled in the art will appreciate that the invention, in its broader aspects, may be constructed somewhat differently. For example, the vibration cancellation mechanism 100 may be incorporated into any driveline component to cancel vibrations that are created in the component during the operation of the vehicle. Accordingly, while the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

We claim:

1. A vehicle comprising:

a vehicle body defining a vehicle passenger compartment;

a drivetrain assembly having a rotatable torque-transmitting component;

a support member coupling the vehicle body to the drivetrain assembly, the support member forming a transmission path along which vibrations produced by the drivetrain assembly during the operation of the vehicle are transmitted to the vehicle body;

a speed sensor for sensing a rotational speed of a component having a speed that is related to a speed of the torque-transmitting component;

at least one actuator coupled to the drivetrain assembly;

at least one sensor operable for monitoring the vibrations transmitted from the drivetrain assembly and producing a sensor signal in response thereto; and a controller coupled to the at least one actuator and the at least one sensor, the controller receiving the sensor and reference signals, the controller predicting a frequency and amplitude at which the drivetrain assembly vibrates based on the rotational speed of the component and generating an actuator signal in response thereto;

wherein the at least one actuator receives the actuator signal and generates a canceling vibration in the drivetrain assembly in response thereto, the canceling vibration having a predetermined frequency and amplitude to substantially cancel-out the vibrations in a predetermined bandwidth that are generated during the operation of the drivetrain assembly to thereby prevent the vibrations generated during the operation of the drivetrain assembly from being transmitted to the vehicle passenger compartment;

wherein the controller selectively varies a set of filter weights that are employed to generate the actuator signal based on the sensor signal; and wherein the controller does not generate the actuator signal until the vehicle has, achieved a predetermined vehicle speed wherein said predetermined vehicle speed is at least about 25 miles per hour.

2. The vehicle of claim 1, wherein the drivetrain assembly is an axle assembly.

3. The vehicle of claim 3, wherein the axle assembly includes a propshaft and an axle shaft and wherein the speed sensor generates a signal that is indicative of the rotational speed of one of the propshaft and the axle shaft.

4. The vehicle of claim 1, wherein the at least one sensor is coupled to the support member and monitors the vibrations transmitted from the drivetrain assembly to the support member.

5. The vehicle of claim 4, wherein the at least one sensor is positioned on the support member at a position corresponding to an anti-node on the support member.

6. The vehicle of claim 1, wherein the at least one actuator is positioned on the drivetrain assembly at a position corresponding to an anti-node on the drivetrain assembly.

7. A drivetrain system comprising:

a drivetrain assembly including a rotatable torque-transmitting component;

a speed sensor for sensing a rotational speed of a component having a speed that is related to a speed of the torque-transmitting component;

at least one actuator coupled to the drivetrain assembly; and a controller coupled to the at least one actuator and the speed sensor, the controller predicting a frequency and amplitude at which the drivetrain assembly vibrates based on the rotational speed of the component and generating an actuator signal in response thereto;

wherein the at least one actuator receives the actuator signal and generates a canceling vibration in the drivetrain assembly in response thereto, the canceling vibration having a predetermined frequency and amplitude to substantially cancel-out the vibrations in a predetermined bandwidth that are generated during the operation of the drivetrain assembly; and wherein the at least one actuator is not operated to cancel out vibration in the drivetrain assembly until the speed of the torque-transmitting component has achieved a predetermined speed, wherein said predetermined vehicle speed is at least about 25 miles per hour.

8. The drivetrain system of claim 7, wherein the actuator signal is indicative of a difference between the vibrations generated during the operation of the drivetrain assembly and the vibrations generated by the at least one actuator.

9. The drivetrain system of claim 8, wherein the controller employs an algorithm to determine a revised set of filter weights for modifying the actuator signal.

10. The drivetrain system of claim 9, wherein the algorithm is a least-mean-square algorithm.

11. The drivetrain system of claim 10, wherein the least-mean-square algorithm analyzes the predicted frequency and amplitude of the canceling vibration and the difference between the vibrations generated during the operation of the drivetrain assembly and the vibrations generated by the at least one actuator to determine the set of filter weights.

12. The drivetrain system of claim 9, wherein the algorithm analyzes the predicted frequency and amplitude of the canceling vibration, the difference between the vibrations generated during the operation of the drivetrain assembly and the vibrations generated by the at least one actuator and a desired output to determine the set of filter weights.

13. The drivetrain system of claim 12, wherein the set of filter weights is employed by a filter to determine the frequency and amplitude of the canceling vibration.

14. The drivetrain system of claim 13, wherein the filter is a finite impulse response filter.

15. The drivetrain system of claim 9, wherein the set of filter weights includes a first weight for a current sample of a reference signal and a second weight for a previous sample of the reference signal.

16. The drivetrain system of claim 9, wherein the set of filter weights are employed by a finite impulse response filter to determine the frequency and amplitude of the canceling vibration.

17. The drivetrain system of claim 9, wherein the controller selects a filter weight from a plurality of said filter weights based on the actuator signal.

18. The drivetrain system of claim 7, wherein the at least one actuator includes a piezo-electric device for exerting a force onto the drivetrain assembly in response to the actuator signal.

19. The drivetrain system of claim 7, wherein the at least one actuator includes a magnetostrictive material for exerting a force onto the drivetrain assembly in response to a changing magnetic field produced in response to the actuator signal.

20. The drivetrain system of claim 7, further comprising at least one sensor operable for monitoring the vibrations transmitted from the drivetrain assembly and producing a sensor signal in response thereto, the sensor signal being received by the controller and the controller selectively varying the actuator signal in response thereto.

21. The drivetrain system of claim 7, wherein the drivetrain assembly is an axle assembly.

22. A vehicle drivetrain system comprising:

an axle assembly having a propshaft and an axle shaft;

an actuator coupled to the axle assembly; and a controller coupled to the actuator, the controller predicting a frequency and amplitude at which the axle assembly vibrates based on a rotational speed of at least one of the propshaft and the axle shaft and generating an actuator signal in response thereto;

wherein the actuator receives the actuator signal and generates a canceling vibration in the axle assembly in response thereto, the canceling vibration having a predetermined frequency and amplitude to substantially cancel-out the vibrations in a predetermined bandwidth that are generated during the operation of the axle assembly; and wherein the actuator includes a magnetostrictive material for exerting a force onto the axle assembly in response to a changing magnetic field produced in response to the actuator signal.

wherein the actuator is not operated to cancel-out the vibrations until the rotational speed of the at least one of the propshaft and the axle shaft has achieved a predetermined speed, wherein said predetermined speed is at least about 25 miles per hour.

* * * * *